United States Patent [19]

Fukamachi

[11] Patent Number: 5,447,363
[45] Date of Patent: Sep. 5, 1995

[54] AUTOMATIC BRAKE SYSTEM AND CONTROL METHOD THEREOF

[75] Inventor: Kazuhiro Fukamachi, Oota, Japan

[73] Assignee: Fuji Jukogyo Kabushiki Kaisha, Tokyo, Japan

[21] Appl. No.: 100,368

[22] Filed: Aug. 2, 1993

[30] Foreign Application Priority Data

Aug. 25, 1992 [JP] Japan .................. 4-248699

[51] Int. Cl.⁶ ........................................ B60T 8/58
[52] U.S. Cl. ........................... 303/125; 180/169
[58] Field of Search ............... 303/10, 11, 91, 94, 303/95, 100, 115.1, 115.2, 115.4, 116.1, 116.2; 367/909; 180/167–169; 364/426.01, 426.04, 461

[56] References Cited

U.S. PATENT DOCUMENTS

| | | | |
|---|---|---|---|
| 3,898,913 | 8/1975 | Herdrickson et al. | 303/100 X |
| 4,073,359 | 2/1978 | Fujiki et al. | 180/169 |
| 4,412,701 | 1/1983 | Barckhardt | 180/169 X |
| 5,053,979 | 10/1991 | Etoh | 180/169 X |

FOREIGN PATENT DOCUMENTS 63-24078  2/1988  Japan .

*Primary Examiner*—Robert J. Oberleitner
*Assistant Examiner*—Lee W. Young
*Attorney, Agent, or Firm*—Beveridge, DeGrandi, Weilacher & Young

[57] ABSTRACT

In an automatic brake system provided with a pressure source including both an oil pump and an accumulator, one or more brake systems are controlled on the basis of pump pressure smoothly at low speed, but on the basis of accumulator pressure at medium or high speed. Since the pump pressure and the accumulator pressure can be used properly according to vehicle speed, the vehicle can be braked automatically and appropriately in case of the presence of a collision against another vehicle running ahead.

12 Claims, 6 Drawing Sheets

AUTOMATIC BRAKE SYSTEM AND CONTROL METHOD THEREOF

BACKGROUND OF THE INVENTION

1. Field of the Invention

The present invention relates to an automatic brake system and a method of controlling the same, and more specifically to a system for automatically braking an automotive vehicle for the prevention of a collision against another vehicle traveling ahead and a method of controlling the brake system automatically on the basis of both pump pressure and accumulator pressure.

2. Description of the Prior Art

As one of the recent safety countermeasures for an automotive vehicle, there has been proposed an automatic brake system such that the vehicle can be braked automatically in case a collision against an opposing object is predicted during travel. In general the brake system includes a pressure source composed of a pump driven by a motor to pump up a hydraulic medium (e.g., oil) and an accumulator for accumulating pressure generated by the pump in the ordinary brake system provided with an automatic brake system, an ABS (antilock braking system), a TCS (traction control system), etc. The pressure accumulated by the accumulator is introduced intermittently into the brake system through a solenoid valve in order to improve the pressure response to the braking system.

In the automatic brake system, however, the vehicle must be braked automatically over a wide speed range from a low speed of travel to a high speed of travel. Therefore, where the brake system is actuated on the basis of only the accumulator pressure in order to improve only the response characteristics to the braking system, various problems arises as follows: since the accumulator pressure is controlled by a solenoid valve, excessive surge pressure is inevitably generated whenever the solenoid valve is opened or closed momentarily and therefore the hydraulic pressure changes stepwise, with the result that the driving comfortability is deteriorated markedly in particular at low travel speed. On the other hand, when the brake system is actuated on the basis of only the pump pressure, the surge pressure can be reduced and therefore the hydraulic pressure can be controlled smoothly. However, the response characteristics of the pump pressure with respect to the brake system is not satisfactory, so that it is rather difficult to apply an emergency brake to the vehicle running at medium or high speed.

An example of the prior art automatic braking system is disclosed in Japanese Utility Model Laid-Open Application No. 63-24078. In this prior art reference, a hydraulic pressure generated by a hydraulic pressure source is accumulated in an accumulator, and the accumulated hydraulic pressure is supplied to wheel cylinders to actuate actuators in response to a control signal, in case there exists a danger of collision against an opposing object.

In the above-mentioned automatic brake system, however, since the brake system is actuated on the basis of only the accumulator pressure, the following problem arises: when the hydraulic pressure is set so as to be suitable for the emergency brake required when the vehicle is traveling at medium or high speed, it is difficult to brake the vehicle gently when the vehicle is traveling at low speed, so that the riding comfortability is deteriorated and further an excessive brake often causes a danger.

SUMMARY OF THE INVENTION

With these problems in mind, therefore, it is the primary object of the present invention to provide an automatic brake system with a pressure source composed of a pump and an accumulator, which can apply brake pressure appropriately over a wide speed range, by using properly the pump pressure and the accumulator pressure according to the vehicle speed.

To achieve the above-mentioned object, the present invention provides an automatic brake control system for an automotive vehicle, which comprises: means for predicting a collision against another vehicle; means for calculating a required deceleration speed when a collision is predicted by said predicting means; means for calculating a target brake pressure on the basis of the calculated deceleration speed; means for detecting vehicle speed; means for pumping up a hydraulic medium to generate a pump brake pressure; means for accumulating the pump brake pressure to generate an accumulator brake pressure; means for introducing the pump brake pressure and the accumulator brake pressure into at least one brake pipe system; and control means for controlling said pumping means, the accumulating means and the brake pressure introducing means, in such a way that the brake pressure can be increased up to the calculated target brake pressure, on the basis of the pump brake pressure at low vehicle speed and of the accumulator brake pressure at medium or high vehicle speed.

The brake pressure introducing means comprises at least one pressurizing solenoid valve interposed between the pumping and accumulating means and the brake pipe system; and at the low vehicle speed running, the control means controls the pressurizing solenoid valve in such a way that the accumulator brake pressure is first released into the brake pipe system through said solenoid valve and then the brake pressure is increased up to the target pressure gradually by introducing the pump brake pressure into the brake pipe system through said solenoid valve.

The brake pressure introducing means comprises at least one pressurizing solenoid valve interposed between the pumping and accumulating means and the brake pipe system; the control means comprises accumulator control means; and at the medium or high vehicle speed running, the accumulator control means retains the high accumulator brake pressure within a predetermined pressure range, and the control means controls the pressurizing solenoid valve in such a way that the brake pressure is increased stepwise up to the target pressure by introducing the retained accumulator brake pressure intermittently into the brake pipe system through said solenoid valve.

Further, the introducing means comprises at least one depressurizing solenoid valve interposed between a master cylinder and the brake pipe system, for connecting the master cylinder to the brake pipe system in an ordinary braking operation and for disconnecting the master cylinder from the brake pipe system in an automatic braking operation.

To achieve the above-mentioned object, the present invention further provides a method of automatically braking an automotive vehicle, comprising the steps of: detecting whether a danger of collision against another vehicle exists or not; detecting running speed of its own vehicle when there exists a danger of collision against another vehicle; checking whether the detected running speed exceeds a predetermined speed; increasing brake pressure up to a target brake pressure value on the basis of brake pressure generated by a hydraulic pump when the detected running speed is lower than the predetermined speed; and increasing brake pressure up to the target brake pressure value on the basis of brake pressure generated by an accumulator for accumulating hydraulic pump pressure when the detected running speed is higher than the predetermined speed.

Further, the step of controlling the brake pressure on the basis of the pump brake pressure comprises the steps of: releasing pressure of the accumulator; actuating the hydraulic pump to generate the pump brake pressure; introducing the pump brake pressure into a brake pipe system gradually up to the target value, checking whether the pump brake pressure reaches the target value; and stopping actuating the hydraulic pump and keeping the target brake pressure value.

Further, the step of controlling the brake pressure on the basis of the accumulator brake pressure comprises the steps of: maintaining accumulator pressure within a predetermined pressure range by actuating a hydraulic pump; intermittently introducing the accumulator brake pressure into a brake pipe system stepwise up to the target value, checking whether the brake pressure reaches the target value; and stopping the introduction of the brake pressure into the brake pipe system and keeping the target brake pressure value.

In the automatic braking system and the method of controlling the same system, in case a danger of collision against another object arises at low speed, the brake pipe system is pressurized smoothly on the basis of brake pressure obtained by the pump, so that it is possible to brake the vehicle gently without producing shock to the driver and the passengers. On the other hand, in case a danger of collision against another object arises at medium or high speed, the brake pipe system is pressurized abruptly on the basis of brake pressure obtained by the accumulator, so that it is possible to brake the vehicle in abrupt fashion for prevention of collision against another object.

DETAILED DESCRIPTION OF THE PREFERRED EMBODIMENT

A preferred embodiment of the present invention will become understood from the following detailed description referring to the accompanying drawings.

Figure 1:
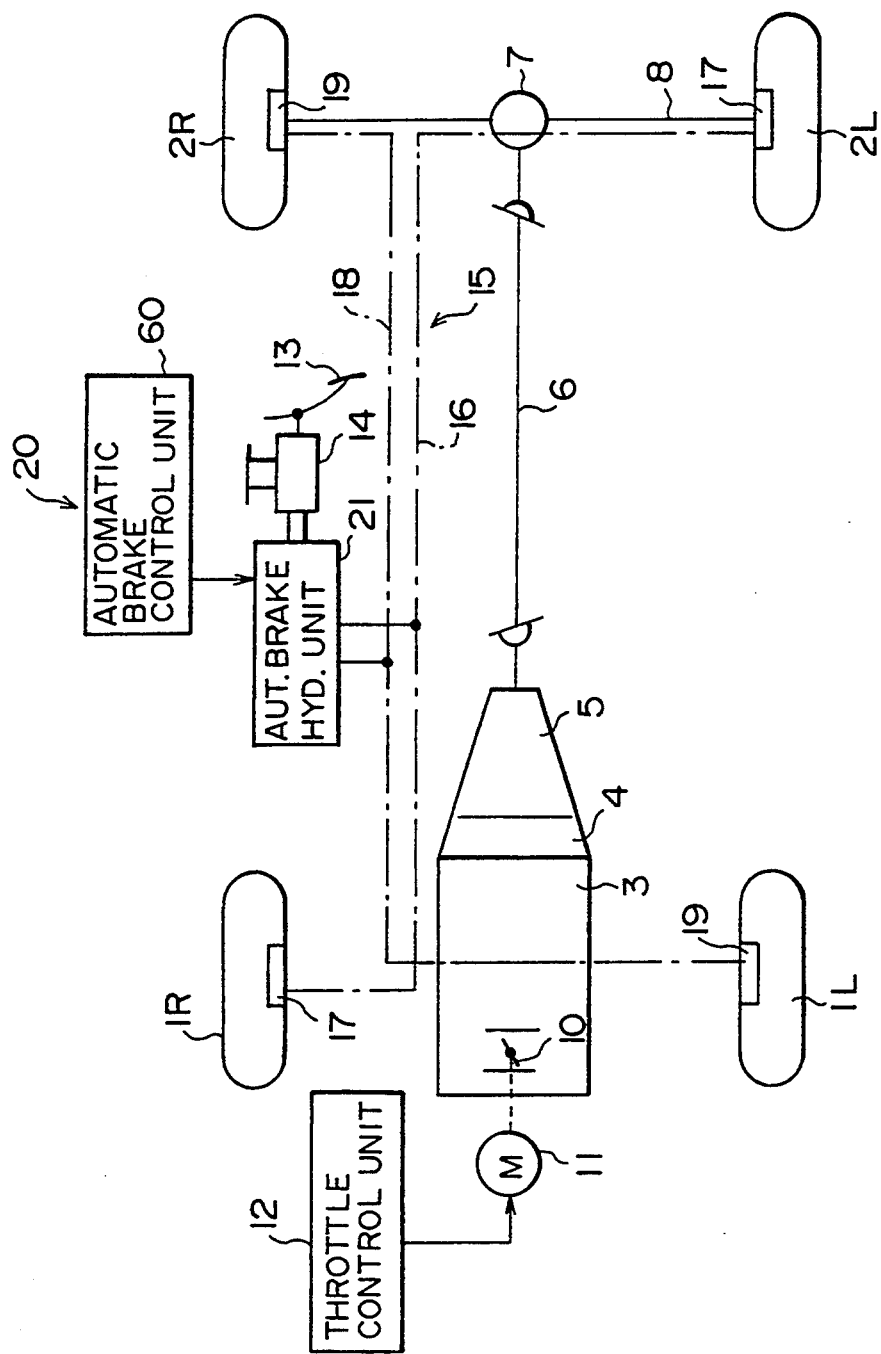
FIG. 1 is a diagrammatical view showing a drive system and a brake system of an automotive vehicle.

A drive system and a brake system of an automotive vehicle will be first described hereinbelow with reference to FIG. 1. An automotive vehicle is provided with four wheels (front right, front left, rear right and rear left) 1R, 1L, 2R and 2L. The drive system is composed of an engine 3, a clutch 4, a transmission 5, a propeller shaft 6, a differential gear 7, a rear wheel shaft 8, etc. The power of the engine 3 is transmitted to the two rear wheels 2R and 2L through these drive system elements 4 to 8, respectively. A throttle valve 10 of the engine 3 is connected to an actuator (e. g., motor) 11. The actuator 11 is driven by a throttle control unit 12 so that the throttle valve 10 can be controlled for traction control, cruise control, automatic brake control, etc.

The brake system is composed of a brake pedal 13, a master cylinder 14 connected to the brake pedal 3, and two diagonal brake pipe systems 15 of a primary brake pipe system 16 and a secondary brake pipe system 18, etc. The primary brake pipe system 16 communicates with two wheel cylinders 17 of the front right wheel 1R and the rear left wheel 2L, and the secondary brake pipe system 18 communicates with two wheel cylinders 19 of the front left wheel 1L and the rear right wheel 2R, respectively. In the present embodiment, an automatic brake system 20 is further provided for the ordinary brake system as described above. In more detail, an automatic brake system 20 is composed of an automatic brake hydraulic unit 21 connected midway to the primary and secondary brake pipe systems respectively, and an automatic brake control unit 60 for controlling the automatic brake hydraulic unit 21 on the basis of control signals. Further, when an ABS (anti-lock braking system) is provided for the ordinary brake system, the ABS hydraulic unit is connected to the downstream side of the automatic brake hydraulic unit 21 in series thereto in order to prevent wheel lock caused during the automatic brake operation.

Figure 2:
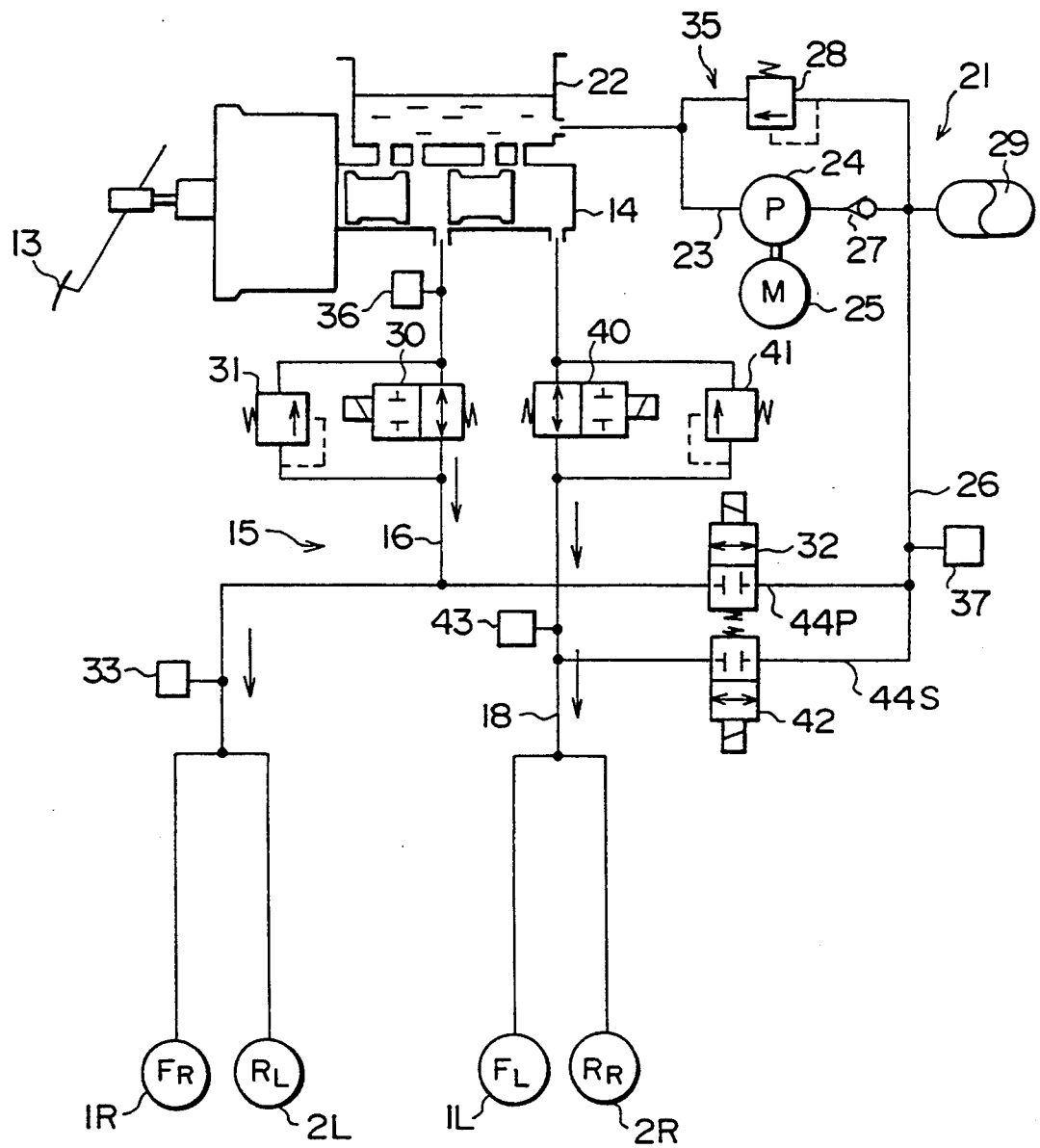
FIG. 2 is a hydraulic circuit diagram showing a hydraulic unit of an automatic brake system.

The automatic brake hydraulic unit 21 will be described in further detail hereinbelow with reference to FIG. 2. As already explained, the brake pipe system 15 is divided into two diagonal systems of the primary brake pipe system 16 and the secondary brake pipe system 18. The automatic brake hydraulic unit 21 is roughly composed of a pressure source 35 for supplying brake pressure to the brake pipe systems 16 and 18; two depressurizing solenoid valves 30 and 40 for releasing the brake pressure from the brake pipe systems; two pressurizing solenoid valves 32 and 42 for applying brake pressure to the brake pipe systems 16 and 18; a plurality of pressure relief valves 28, 31 and 41 for relieving an excessive pressure; and a plurality of pressure sensors 36, 37, 33 and 43.

The pressure source 35 is composed of an oil pump 24 for pumping up a hydraulic medium to generate brake pressure, a motor 25 for driving the oil pump 24, the relief valve 28, an accumulator 29 for accumulating the generated brake pressure, and a check valve 27 for preventing the accumulated pressure from being supplied in the reverse direction. The oil pump 24 is connected to an oil reservoir 22 of the master cylinder 14 via a pipe 23, and driven by the motor 25 to generate an oil pressure. The outlet side of the oil pump 24 is connected to the relief valve 28 and the accumulator 29 via the check valve 27. Further, the oil pump 24 and the accumulator 29 are connected to the primary brake pipe system 16 through a pipe 26 and a pipe 44P and via the pressurizing solenoid valve 32. In the same way, the oil pump 24 and the accumulator 29 are connected to the secondary brake pipe system 18 through the pipe 26 and a pipe 44S branched from the pipe 44P and via the pressurizing solenoid valve 42.

Therefore, when the pressurizing solenoid valve 32 is energized to be opened, a low speed pump pressure Pp or a higher speed accumulator pressure Pa can be supplied to the primary brake pipe systems 16 as the brake pressure for automatic brake operation. When the pressurizing solenoid valve 32 is deenergized closed, on the other hand, brake pressure cannot be supplied to the primary brake pipe systems 16 for ordinary brake operation.

In the same way, when the pressurizing solenoid valve 42 is energized to be opened, a low speed pump pressure Pp or a higher speed accumulator pressure Pa can be supplied to the secondary brake pipe systems 18 as the brake pressure for automatic brake operation. When the pressurizing solenoid valve 42 is deenergized and closed, on the other hand, brake pressure cannot be supplied to the secondary brake pipe systems 18 for ordinary brake operation.

Further, the master cylinder 14 is connected to the primary brake pipe system 16 via the depressurizing solenoid valve 30 and the relief valve 31, and to the secondary brake pipe system 18 via the depressurizing solenoid valve 40 and the relief valve 41, respectively.

Therefore, when the depressurizing solenoid valve 30 is closed, the master cylinder 14 is disconnected from the primary brake pipe system 16 for the automatic brake operation so that the brake pressure can be maintained in the primary brake pipe system 16. When deenergized open, however, the master cylinder 14 is connected to the primary brake pipe system 16 for the ordinary brake operation with the use of the brake pedal 13 and the master cylinder 14.

In the same way, when the depressurizing solenoid valve 40 is closed, the master cylinder 14 is disconnected from the secondary brake pipe system 18 for the automatic brake operation so that the brake pressure can be maintained in the secondary brake pipe system 18. When deenergized open, however, the master cylinder 14 is connected to the secondary brake pipe system 18 for the ordinary brake operation with the use of the brake pedal 13 and the master cylinder 14.

Further, the hydraulic pressure sensor 36 is connected to the master cylinder 14 to detect the pedal pressure; a hydraulic pressure sensor 37 is connected to the accumulator 29 to detect the accumulator pressure; the hydraulic pressure sensor 33 is connected to the primary brake pipe system 16 to detect the primary brake pipe system pressure; and the hydraulic pressure sensor 43 is connected to the secondary brake pipe system 18 to detect the secondary brake pipe system pressure, respectively.

Figure 3:
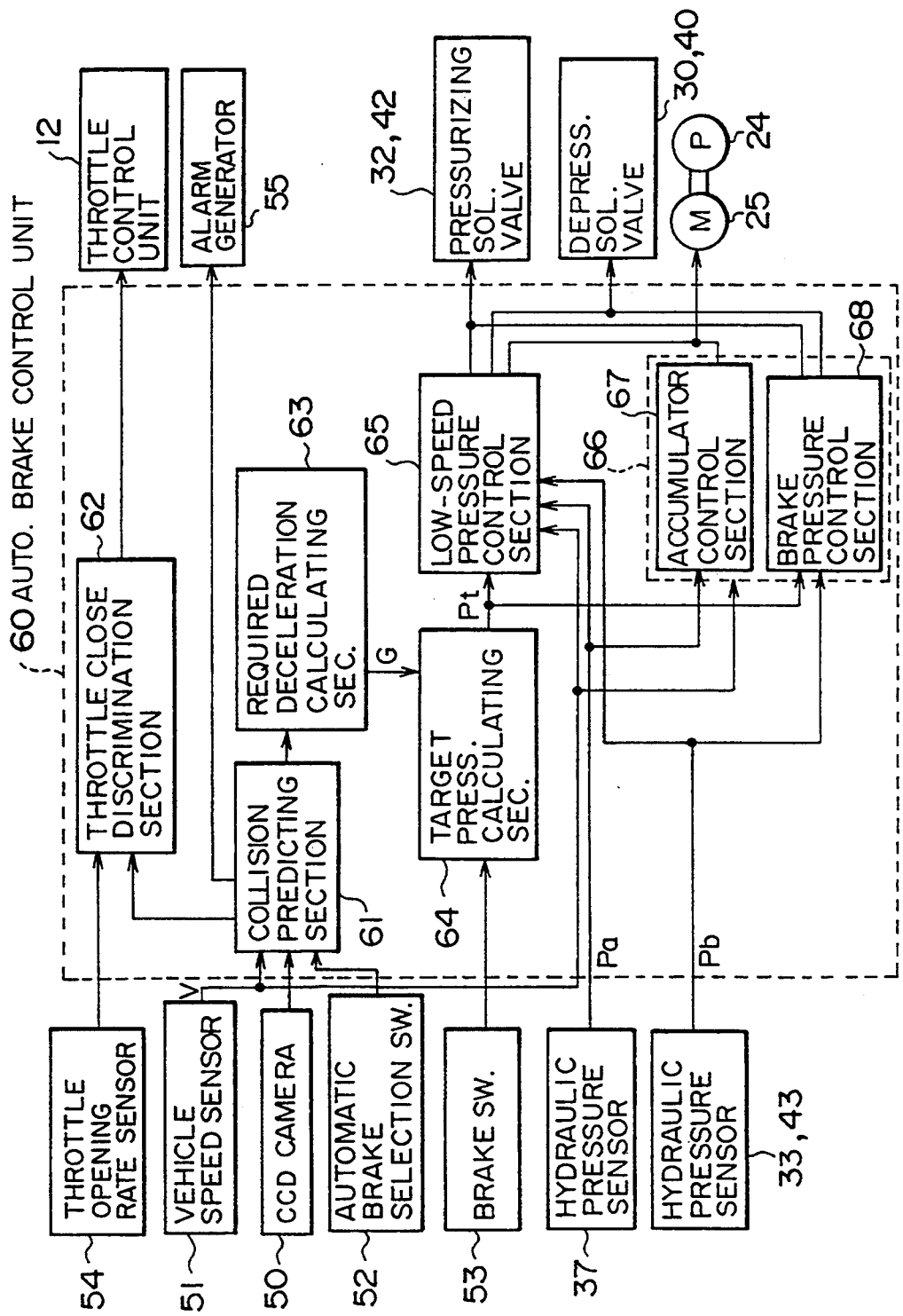
FIG. 3 is a block diagram showing a preferred embodiment of the automatic brake system according to the present invention.

An automatic brake control unit 60 will be described in detail hereinbelow with reference to FIG. 3. The automatic brake control unit 60 comprises a collision predicting section 61, a throttle close discriminating section 62, a required deceleration calculating section 63, a target brake pressure calculating section 64, a low-speed brake pressure control section 65, and a medium- or high-speed brake pressure control section 66 composed of an accumulator control section 67 and a brake pressure control section 68. To this automatic brake control unit 60, various sensors and switches are connected such as a CCD (charge coupled device) camera 50, a vehicle speed sensor 51, an automatic brake selection switch 52, already-explained hydraulic pressure sensors 33, 37 and 43, a brake switch 53, a throttle opening rate sensor 54, etc.

The collision predicting section 61 is connected to the CCD camera 50, the automatic brake control selection switch 52 and the vehicle speed sensor 51. The collision predicting section 61 calculates a relative distance L between its own vehicle and another vehicle traveling ahead and a relative speed Vs between both on the basis of image information of the CCD camera 50 and speed information of the vehicle speed sensor 51 when the automatic brake selection switch 52 is turned on, in order to predict the presence or absence of a danger of a rear-end collision against another vehicle running ahead. In case of the presence of a danger of the collision, the collision predicting section 61 activates an alarm generator 55 to output an approach alarm signal to the driver.

Further, the throttle close discriminating section 62 is connected to the throttle opening rate sensor 54 and the collision predicting section 61, and outputs a throttle close signal to a throttle control unit 12, when the throttle opening rate exceeds a predetermined value under the condition that the collision predicting section 61 predicts the presence of a rear-end collision.

The required deceleration calculating section 63 is connected to the collision predicting section 61, and calculates a required deceleration speed G to prevent the rear-end collision on the basis of the calculated results of the collision predicting section 61.

The target brake pressure calculating section 64 receives the calculated required deceleration speed G and a brake signal of the brake switch 53, and calculates a target brake pressure Pt according to the required deceleration speed G when the brake switch is turned off (i.e, when no brake is being applied).

Here, in order to control the brake pressure according to the vehicle speed V, the brake control unit 60 comprises in particular the low-speed brake pressure control section 65 and the medium- and high-speed brake pressure control section 66. These two brake pressure control sections 65 and 66 are connected to the vehicle speed sensor 51, the hydraulic pressure sensors 37, 33 and 43, respectively.

When the automatic brake is required to be applied at low vehicle speed, the low-speed brake pressure control section 65 outputs a turn-on signal to the pressurizing solenoid valves 32 and 42 (these valves are energized open) to release the accumulator pressure Pa into the brake pipe system 15. Here, when the hydraulic pressure sensor 37 detects that the accumulator pressure Pa is lower than a predetermined value, the control section 65 outputs a turn-on signal to the depressurizing solenoid valves 30 and 40 (these valves are energized closed for automatic brake operation) and further a drive signal to the motor 25 to pump up the hydraulic medium to the pump pressure Pp. Further, when either one of the actual brake pressures detected by the hydraulic pressure sensors 33 and 43 reaches the target brake pressure Pt, the control section 65 stops outputting the motor drive signal and further outputs a turn-off signal to the pressurizing solenoid valves 32 and 42 (these valves are deenergized closed) to maintain the target brake pressure Pt. Thereafter, when the automatic brake application has been released, the control section 65 outputs the turn-off signal to the depressurizing solenoid valves 30 and 40 (these valves are deenergized open) to return to the ordinary brake operation.

On the other hand, the medium- and high-speed pressure control section 66 comprises the accumulator control section 67 and the brake pressure control section 68. The accumulator control section 67 outputs a drive signal to the motor 25 whenever the accumulator pressure Pa detected by the hydraulic pressure sensor 37 drops below a lower pressure limit value at medium- and high-speed travel and a stop signal to the motor 25 whenever Pa rises above an upper pressure limit value, in order to maintain the accumulator pressure Pa at a desired brake pressure whenever the vehicle is running at medium and high speed. The brake pressure control section 68 outputs a turn-on signal to the depressurizing solenoid valves 30 and 40 (these valves are energized closed) for the automatic brake operation, and further outputs turn-on and turn-off signals to the pressurizing valves 32 and 42 several times (these valves are energized open or deenergized closed repeatedly) on the basis of difference between the target brake pressure Pt and the actual brake pressure Pb detected by the hydraulic pressure sensors 33 and 43. When both brake pressures Pt and Pb match each other, the control section 68 outputs a turn-off signal to the pressurizing valves 32 and 42 (deenergized close) and maintains the target brake pressure Pt. Thereafter, when the automatic brake operation has been released, the control section 68 outputs the turn-off signal to the depressurizing solenoid valves 30 and 40 (deenergized open) to return to the ordinary brake operation by the master cylinder 14 and the brake pedal 13.

Figure 4:
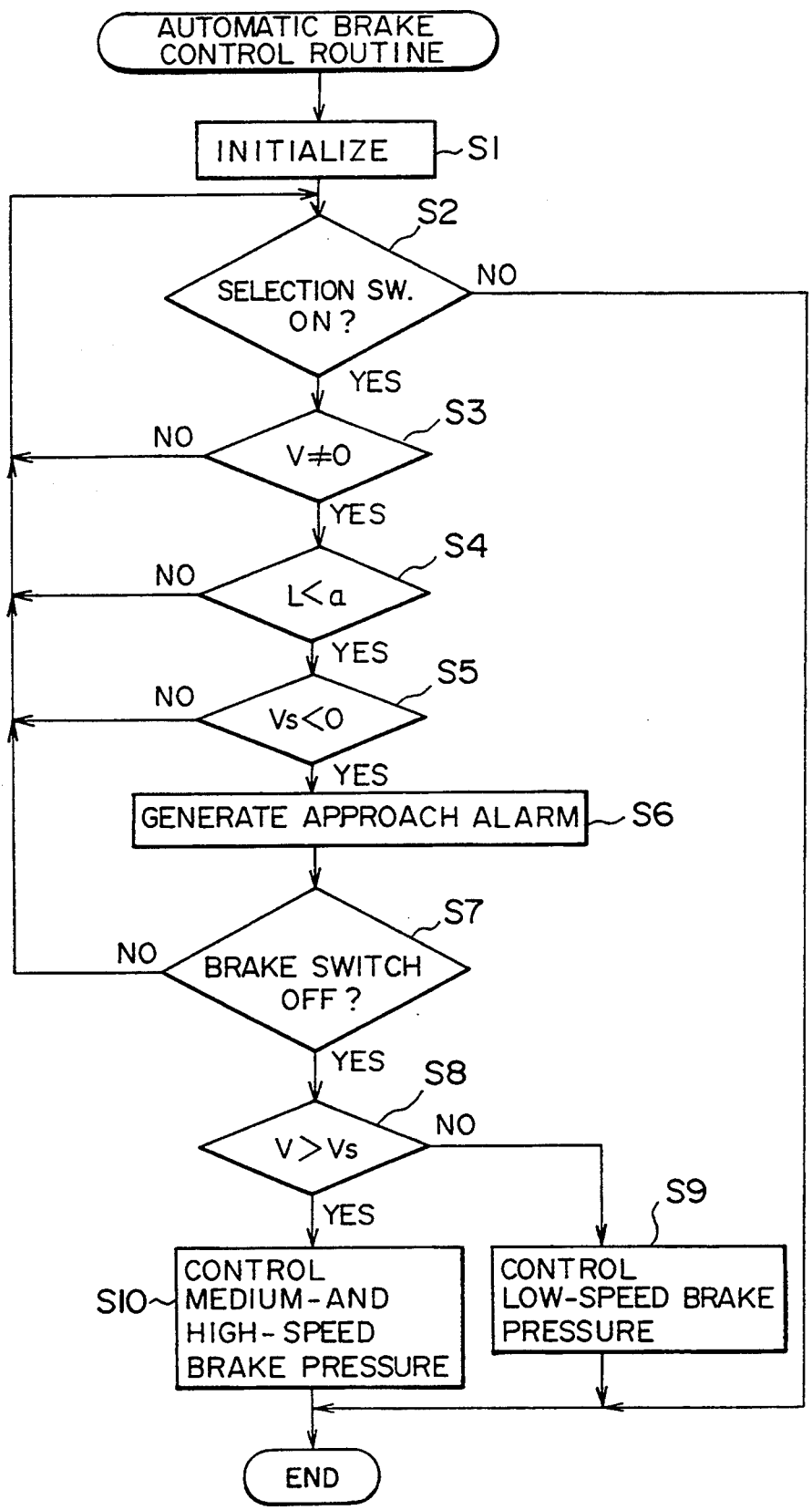
FIG. 4 is a flowchart showing the control procedure of the automatic brake system according to the present invention.

The control procedure of the automatic brake control unit 60 shown in FIG. 3 will be described with reference to a flowchart shown in FIG. 4.

When an ignition switch is turned on, control routine is initialized (in step S1). Thereafter, control checks whether the automatic brake selection switch 52 is turned on or not (in step S2). If the switch 52 is turned off, control ends without executing any procedure. On the other hand, if the switch 52 is turned on, control proceeds to the succeeding step to check the vehicle speed V (in step S3). When the vehicle is not running (V=0), control ends. Further, when the vehicle is running (V≠0), control proceeds to the succeeding step to check the presence or absence of another vehicle running ahead and further calculates a relative distance L between its own vehicle and another vehicle. If another vehicle running ahead is present and further the calculated distance L is less than a predetermined value a (in step S4), control calculates a relative speed Vs between the two vehicles, and if the calculated relative speed Vs decreases (Vs<0: the speed of its own vehicle exceeds the speed of another vehicle running ahead) and therefore there exists a danger of an rear-end collision (in step S5), control proceeds to the succeeding step to generate an approach alarm (in step S6). Thereafter, control checks whether the brake switch 53 is turned on or not. If the brake switch is turned on and thereby the brake is applied by the brake pedal 13 and the master cylinder 14 (in step S7), control returns to the step S2.

On the other hand, in case the brake switch is turned off, since this indicates that the brake pedal 13 is not depressed, control proceeds to the succeeding step to check the vehicle speed V of its own vehicle. If the vehicle speed V is lower than a predetermined vehicle speed Vs (i.e., the vehicle is running at low speed) (in step S8), control selects the automatic low-speed brake pressure control (in step S9). On the other hand, if the vehicle speed V is higher than a preset vehicle speed Vs (i.e., vehicle is running at medium or high speed) (in step S8), control selects the automatic medium- and high-speed brake pressure control (in step S10).

Figure 5:
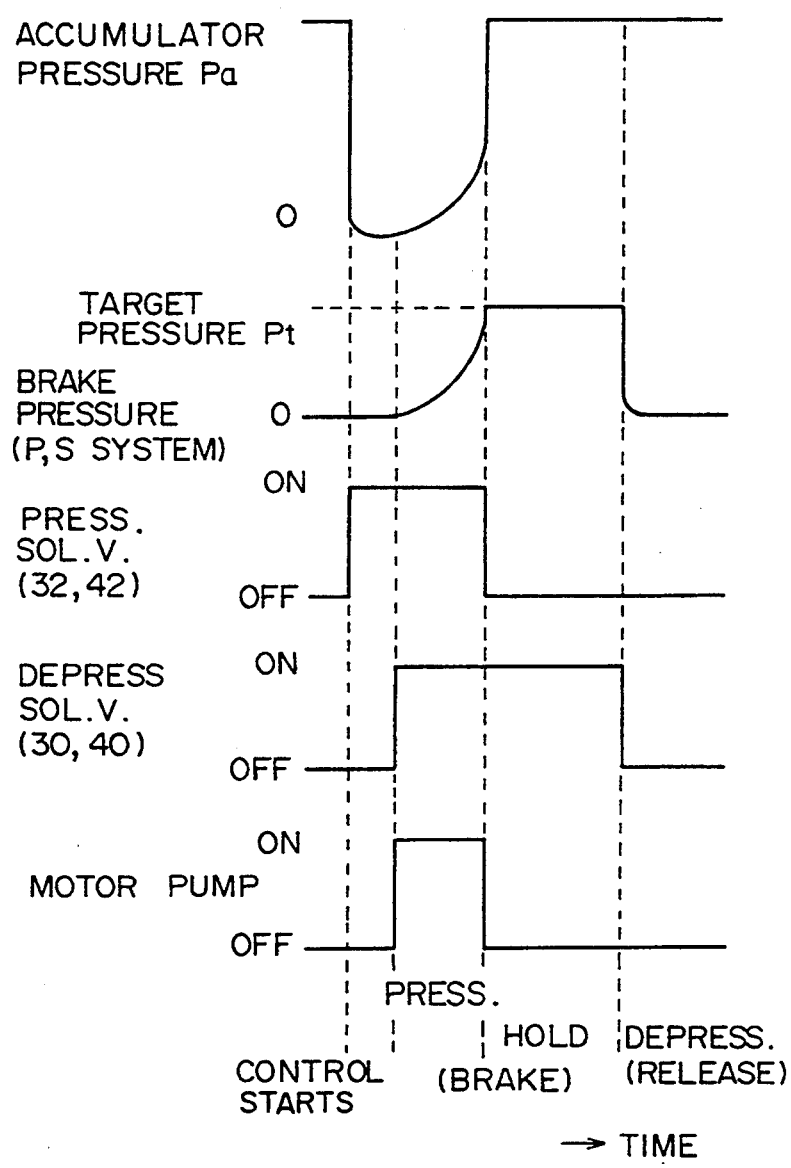
FIG. 5 is a timing chart showing the brake pressure control operation at low speed in the automatic brake system according to the present invention.

The automatic low-speed brake pressure control will be explained with reference to a timing chart as shown in FIG. 5. The low speed pressure control section 65 first turns on the pressurizing solenoid valves 32 and 42 to introduce the accumulator pressure Pa of the accumulator 29 of the pressure source 35 into the primary and secondary brake pipe systems 16 and 18, so that the accumulator pressure Pa drops sharply. When the accumulator pressure Pa drops below a preset value, the control section 65 energizes the depressurizing solenoid valves 30 and 40 (these valves are closed) to disconnect the brake pipe systems 16 and 18 from the master cylinder 14 and further drives the oil pump 24 by the motor 25. Therefore, the pump pressure Pp can be established and then introduced into the primary and secondary brake pipe system 16 and 18, respectively. In this case, the pulsatile pressure of the oil pump 24 can be absorbed by the accumulator 29. Accordingly, the brake pressure Pb rises smoothly owing to both the pressurization characteristics of the pump itself and the pulsatile pressure absorption characteristics of the accumulator 29.

When the brake pressure Pb of the brake pipe systems 16 and 18 reaches the target pressure Pt, the motor 25 is stopped and the pressurizing solenoid valves 32 and 42 are deenergized closed, so that the target brake pressure Pt is held. Under these conditions, since brake force applied to the four wheels 1L, 1R, 2L and 2R can increase smoothly, it is possible to brake the vehicle softly at low speed, without producing any discomfort or danger, for prevention of a rear-end collision against another vehicle running ahead. When there exists no danger of collision, the pressure depressurizing solenoid valves 30 and 40 are deenergized open to communicate the brake pressure of the master cylinder 14 with the primary and secondary brake pipe systems 16 and 18, so that the automatic brake operation can be returned to the ordinary braking operation.

Figure 6A:
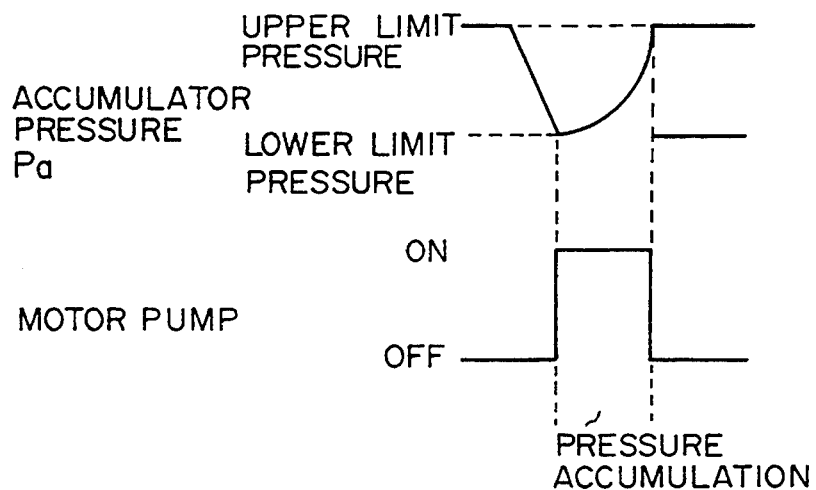
FIGS. 6a and 6b are timing charts for assistance in explaining the brake pressure control operation at medium or high speed in the automatic brake system according to the present invention.
Figure 6B:
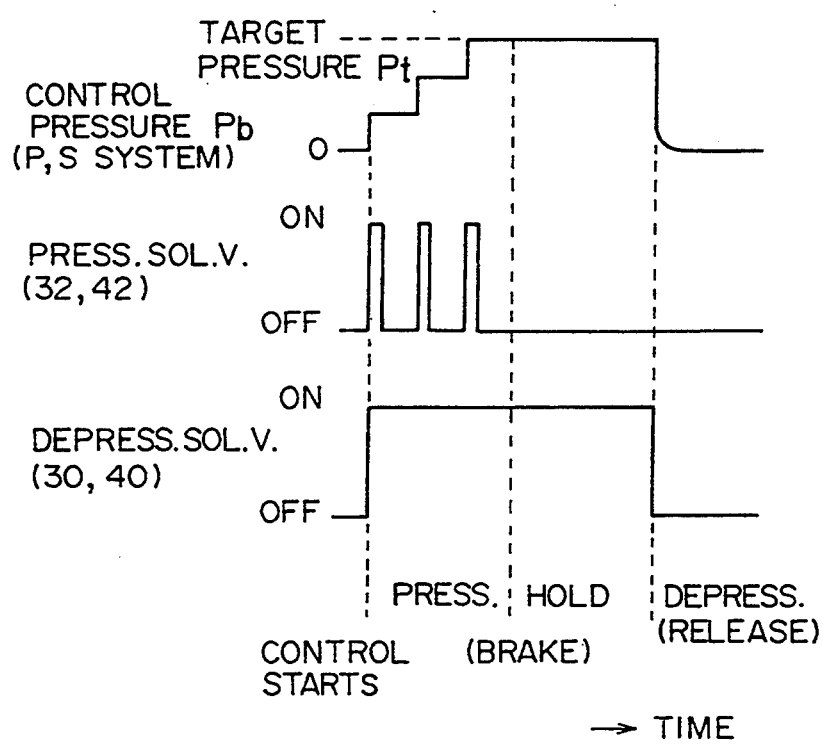

The automatic medium- or high-speed brake pressure control will be explained with reference to a timing chart as shown in FIGS. 6a and b. The medium- or high-speed brake pressure control section 66 maintains the accumulator pressure Pa within a predetermined range between an upper limit value and a lower limit value, by actuating or deactuating the oil pump 24 with the motor 25, as shown in FIG. 6a. Under these conditions, the pressure control section 66 energizes the depressurizing solenoid valves 30 and 40 (closed) and further energizes and deenergizes the pressurizing solenoid valves 37 and 42 repeatedly several times (opened and closed alternately), so that it is possible to introduce the high accumulator brake pressure Pa intermittently into the brake pipe systems 16 and 18. In this case, although the brake pressure Pb fluctuates by generating surge pressure due to the on and off control of the accumulator pressure Pa, it is possible to increase the brake pressure stepwise at high response speed, as shown in FIG. 6b.

Further, when the brake pressure Pb in the primary and secondary brake pipe systems 16 and 18 matches the target pressure Pt under feedback control of the automatic brake control unit 60, the pressurizing solenoid valves 32 and 42 are both deenergized closed to maintain the target pressure Pt. Under these conditions, since brake force applied to the four wheels 1L, 1R, 2L and 2R can increase abruptly, it is possible to brake the vehicle effectively at medium and high speed for prevention of a rear-end collision against another vehicle running ahead. When there exists no danger of collision, the depressurizing solenoid valves 30 and 40 are both deenergized open to communicate the brake pressure of the master cylinder 14 with the primary and secondary brake pipe systems 16 and 18, so that the automatic brake operation can be returned to the ordinary braking operation.

As described above, in the automatic brake system according to the present invention, the oil pump and the accumulator of the brake pressure source are properly used as follows: at the low speed automatic brake operation, the brake pressure is increased by the pump. In this case, since the brake pressure can be increased smoothly without generating any surge pressure, the vehicle can be braked softly and therefore safely at low speed vehicle travel, thus improving the riding comfort. At the medium or high speed automatic brake operation, on the other hand, the brake pressure is increased by the accumulator. In this case, since the brake pressure can be increased abruptly at high response speed, the vehicle can be braked in hard fashion and therefore securely at medium or high speed vehicle travel.

Further, in the automatic brake system according to the present invention, since the pressure source is composed of the oil pump and the accumulator, the pressure source can be controlled by energizing and deenergizing the solenoid valves, so that the structure and the control method is simplified. Further, since the characteristics of the oil pump and the accumulator are both utilized properly, it is possible to determine the brake pressure characteristics appropriately according to the various vehicle speed at high availability rate.

While the presently preferred embodiment of the present invention has been shown and described, it is to be understood that this disclosure is for the purpose of illustration and that various changes and modifications may be made without departing from the scopes of the invention as set forth in the appended claims.

What is claimed is:

1. An automatic brake control system for an automotive vehicle having means for detecting vehicle speed and at least one brake pipe system, an improvement of the brake control system which comprises:
   means for predicting a collision against another vehicle;
   means for calculating a required deceleration speed when a collision is predicted by said predicting means;
   means for calculating a target brake pressure on the basis of the calculated deceleration speed;
   means for pumping up a hydraulic medium to generate a pump brake pressure;
   means for accumulating the pump brake pressure to generate an accumulator brake pressure;
   means for introducing the pump brake pressure and the accumulator brake pressure into the at least one brake pipe system; and
   control means for controlling said pumping means, said accumulating means and said brake pressure introducing means so as to increase said brake pressure to the calculated target brake pressure on the basis of the pump brake pressure at low vehicle speed and on the basis of the accumulator brake pressure at medium or high vehicle speed.

2. The automatic brake control system according to claim 1, wherein:
   said brake pressure introducing means comprises at least one pressurizing solenoid valve interposed between said pumping and accumulating means and the at least one brake pipe system; and
   at the low vehicle speed running, said control means controls the pressurizing solenoid valve so as to release the accumulator brake pressure into the at least one brake pipe system through said solenoid valve and to increase the brake pressure gradually to the target pressure by introducing the pump brake pressure into the at least one brake pipe system through said solenoid valve.

3. The automatic brake control system according to claim 1, wherein:
   said brake pressure introducing means comprises at least one pressurizing solenoid valve interposed between said pumping and accumulating means and the at least one brake pipe system;
   said control means comprises accumulator control means;
   said accumulator control means retains the high accumulator brake pressure within a predetermined pressure range at the medium or high vehicle speed running; and
   said control means controls the pressurizing solenoid valve so as to increase the brake pressure stepwise up to the target brake pressure by introducing the retained high accumulator brake pressure intermittently into the brake pipe system through said solenoid valve.

4. The automatic brake system according to claim 1, wherein:
   said introducing means further comprises at least one depressurizing solenoid valve interposed between a master cylinder and the at least one brake pipe system, so as to connect the master cylinder to the at least one brake pipe system in an ordinary braking operation and to disconnect the master cylinder from the at least one brake pipe system in an automatic braking operation.

5. The automatic brake system according to claim 1, which further comprises:
   an automatic brake selection switch connected to said predicting means for allowing said predicting means to predict a collision against another vehicle, when said automatic brake selection switch is turned on to indicate automatic brake operation.

6. The automatic brake system according to claim 1, which further comprises:
   a brake switch connected to said target brake pressure calculating means for allowing said target brake pressure calculating means to calculate the target brake pressure, and when the brake switch is turned off to indicate no ordinary brake application to the vehicle body.

7. A method of automatically braking an automotive vehicle, comprising the steps of:
   detecting whether a danger of collision against another vehicle exists or not;
   detecting running speed of its own vehicle when there exists a danger of collision against another vehicle;
   checking whether the detected running speed exceeds a predetermined speed;
   increasing brake pressure up to a target brake pressure value on the basis of pump brake pressure generated by a hydraulic pump when the detected running speed is lower than the predetermined speed; and increasing brake pressure up to the target brake pressure value on the basis of accumulator brake pressure generated by an accumulator for accumulating hydraulic pump pressure when the detected running speed is higher than the predetermined speed.

8. The method according to claim 7, wherein the step of controlling the brake pressure on the basis of the pump brake pressure comprises the steps of:

releasing pressure of the accumulator;

actuating the hydraulic pump to generate the pump brake pressure;

introducing the pump brake pressure into a brake pipe system gradually up to the target value, checking whether the pump brake pressure reaches the target value; and stopping actuating the hydraulic pump and keeping the target brake pressure value.

9. The method according to claim 7, wherein the step of controlling the brake pressure on the basis of the accumulator brake pressure comprises the steps of:

maintaining accumulator pressure within a predetermined pressure range by actuating said hydraulic pump;

intermittently introducing the accumulator brake pressure into said brake pipe system stepwise up to the target value, checking whether the accumulator brake pressure reaches the target value or not; and stopping introducing the accumulator brake pressure into the brake pipe system and keeping the target brake pressure value.

10. The method according to claim 7, further comprising the step of:

generating an alarm when a danger of collision against another vehicle is detected.

11. An automatic brake control system for an automotive vehicle, said brake control system having a pump and a hydraulic line mounted on the vehicle for supplying a hydraulic fluid to said automatic brake control system via the hydraulic line, an accumulator connected to said pump for accumulating pressurized fluid, a vehicle speed sensor for detecting a speed of the vehicle and for generating a vehicle speed signal, a camera mounted on the vehicle for sensing an object in front of the vehicle and for producing a front condition signal, an automatic brake selection switch provided on the vehicle for selecting an automatic brake control and for generating an automatic brake signal, a brake switch operatively connected to a brake pedal of the vehicle for producing a brake signal when the brake pedal is depressed, and a hydraulic pressure sensor for detecting an oil pressure in said hydraulic line and for generating a pressure signal, said system further comprising:

predicting means responsive to said front condition signal for predicting a collision against an obstacle and for producing a collision signal;

calculating means responsive to said collision signal for calculating a required deceleration speed when said collision is predicted and for generating a required deceleration signal;

setting means responsive to said required deceleration signal and for deciding a target brake pressure in accordance with said required deceleration speed and for outputting a target pressure signal;

pressure control means responsive to said vehicle speed signal, said pressure signal and said target pressure signal for controlling said hydraulic pressure at a low vehicle speed; and accumulator control means responsive to said vehicle speed signal, said pressure signal and said target pressure signal for increasing said hydraulic pressure at a vehicle speed which is higher than said low vehicle speed so as to improve comfortability and breaking performance in any driving condition of the vehicle.

12. A method of breaking in an automatic brake control system for an automotive vehicle having a pump mounted on said vehicle for supplying a hydraulic fluid to said automatic brake control system via the hydraulic line, an accumulator connected to said pump for accumulating a pressure of said fluid, a vehicle speed sensor for detecting a speed of said vehicle, a camera mounted on said vehicle for sensing an object in front of said vehicle, an automatic brake selection switch provided on said vehicle for selecting an automatic brake system, a brake switch operatively connected to a brake pedal for producing a brake signal when said brake pedal is depressed, and a hydraulic pressure sensor for detecting an oil pressure in said hydraulic line, an improvement of the method which comprises the steps of:

predicting a collision against an obstacle;

calculating a required deceleration speed when said collision is predicted;

deciding a target brake pressure in accordance with said required deceleration speed;

controlling said hydraulic pressure in said automatic brake system based on a predetermined low vehicle speed range; and increasing said hydraulic pressure in said automatic brake system based on a predetermined mid to high vehicle speed range which includes higher speeds than said low vehicle speed range so as to improve comfortability and braking performance in any driving condition of said vehicle.

* * * * *